United States Patent [19]

Charvet et al.

[11] Patent Number: 4,644,989
[45] Date of Patent: Feb. 24, 1987

[54] REINFORCEMENT CABLE FORMED SOLELY OR AT LEAST IN PART OF AN ASSEMBLY OF TWO-WIRE STRANDS; ARTICLES CONTAINING SUCH CABLES

[75] Inventors: Jean-Louis Charvet, Clermont-Ferrand; Christian Garcia, Riom, both of France

[73] Assignee: Compagnie Generale des Etablissements Michelin, Clermont-Ferrand, France

[21] Appl. No.: 676,675

[22] Filed: Nov. 30, 1984

[30] Foreign Application Priority Data

Dec. 16, 1983 [FR] France .............................. 83 20424

[51] Int. Cl.$^4$ .......................... B60C 9/00; D02G 3/48
[52] U.S. Cl. ...................................... 152/451; 57/236; 57/237; 57/902; 152/527; 152/556
[58] Field of Search ............... 152/359, 357 R, 356 R, 152/354 R, 361 R, 361 FP, 361 DM, 362 R, 451, 556, 548, 526, 527, 539, 540; 57/902, 236, 237, 240, 241, 242; 245/1.5

[56] References Cited

U.S. PATENT DOCUMENTS 4,349,063  9/1982  Kikuchi et al. .................. 57/902 X
4,506,500  3/1985  Miyauchi et al. ................ 57/902 X

FOREIGN PATENT DOCUMENTS 2453933  11/1980  France .
2477584   9/1981  France .
2505372  11/1982  France .
7017495   6/1972  Netherlands .

Primary Examiner—Donald E. Czaja
Assistant Examiner—Thomas Bokan
Attorney, Agent, or Firm—Brumbaugh, Graves, Donohue & Raymond

[57] ABSTRACT

A reinforcement cable is formed of an assembly of strands. Each strand is formed of two wires wound around each other in the same direction, with a constant pitch whose length is less than 300 mm. The two wires have linear contact with each other in the form of a helix. These helices have the same direction and the same constant pitch length. The assembly is formed of two strands of the same length of pitch and wound in opposite directions and/or it is formed of two to four strands such that the assembly has the same length of pitch and wound in the same direction as one strand and, with respect to another strand, a different length of pitch and/or wound in an opposite direction.

13 Claims, 13 Drawing Figures

REINFORCEMENT CABLE FORMED SOLELY OR AT LEAST IN PART OF AN ASSEMBLY OF TWO-WIRE STRANDS; ARTICLES CONTAINING SUCH CABLES

The present invention relates to cables for reinforcing materials and more particularly cables intended to reinforce rubbers. Such cables, called "reinforcement cables," are used, for instance, to produce belts, hoses, and pneumatic tires.

It is known to use reinforcement cables formed of assemblies of strands, each strand being formed of two wires. The purpose of the use of these cables is to permit good impregnation of their structure by a material, for instance the material which they are to reinforce, in particular a rubber, so as to limit the problems of corrosion upon the use of articles which contain these cables. Such cables are described, for example, in published French patent applications Nos. 2,453,933 and 2,505,372.

The two-wire strand cables known at the present time have at least one of the following drawbacks:
excessive size;
heterogeneous working of the assembly as a result of a heterogeneous distribution of the stresses between the strands, on the one hand, and between the wires forming the strands, on the other hand.

The object of the invention is to overcome these drawbacks, that is to say to provide a reinforcement cable formed solely or at least in part by an assembly of twowire strands which has all of the following characteristics:
good impregnation of the structure of the assembly;
small size;
homogeneous working of the assembly as a result of a homogeneous distribution of the stresses between the strands of this assembly, on the one hand, and between the wires forming these strands, on the other hand.

Therefore, the reinforcement cable of the invention is characterized by the fact that it is formed solely or at least in part by an assembly of strands, this assembly having the following characteristics when its axis is rectilinear:

(a) each strand is formed of two wires;

(b) in each strand the two wires are wound around each other in the same direction, called the "direction of the strand", with a constant pitch, called the "pitch of the strand", the length of this pitch being less than 300 mm;

(c) in each strand the two wires have substantially linear contact with each other, this line of contact describing substantially a helix, called the "contact helix," around the axis of the assembly;

(d) all the contact helices have the same direction, called the "direction of the assembly," and the same constant length of pitch, called the "length of the pitch of the assembly";

(e) the distance from the contact helices to the axis of the assembly, in a plane perpendicular to said axis, being substantially the same for all of these helices;

(f) the strands are twisted together;

(g) the assembly satisfies at least one of the following two conditions:

(I) it is formed of two strands, the lengths of the piches of the strands being equal and the directions of the strands being opposite;

(II) it is formed of at least two strands and at most four strands; the length of the pitch of the assembly is equal to the length of the pitch of at least one of the strands, the direction of assembly being the same as that of said strand or strands; at least one other strand of the assembly has either a length of pitch different from the length of the pitch of the assembly or both a length of pitch equal to the length of the pitch of the assembly and a direction opposite to the direction of assembly.

The invention also relates to the cable defined above when it is impregnated with a material, for instance a rubber. The invention further relates to articles comprising at least one reinforcement cable according to the invention.

The following examples as well as the schematic figures of the drawing corresponding to these examples are intended to illustrate the invention and facilitate an understanding thereof without, however, limiting its scope.

Figure 8:
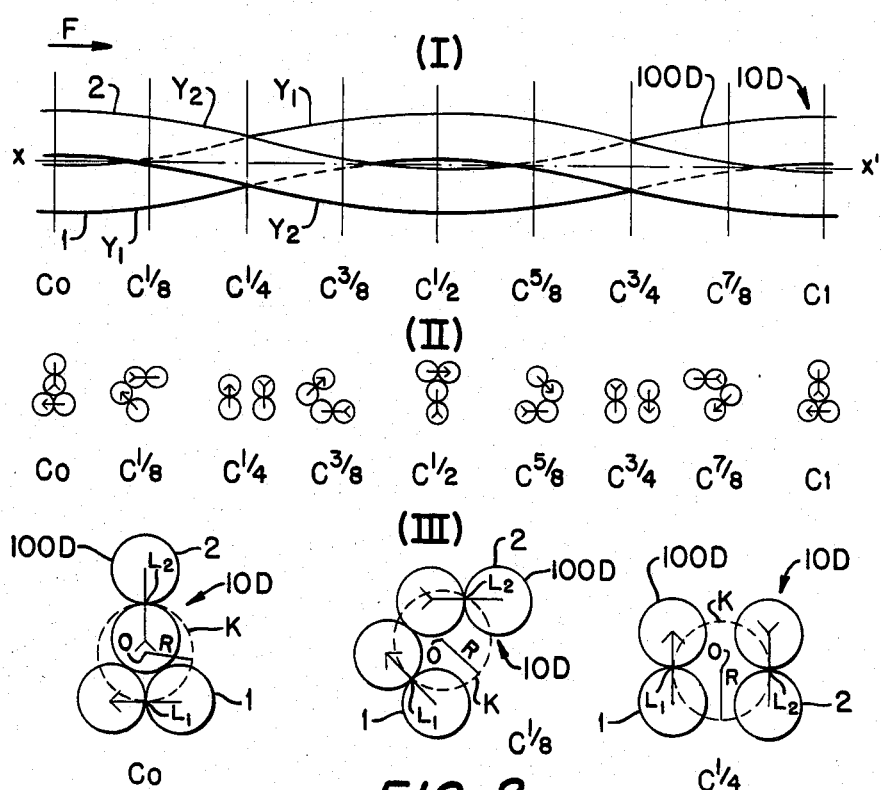
Figure 9:
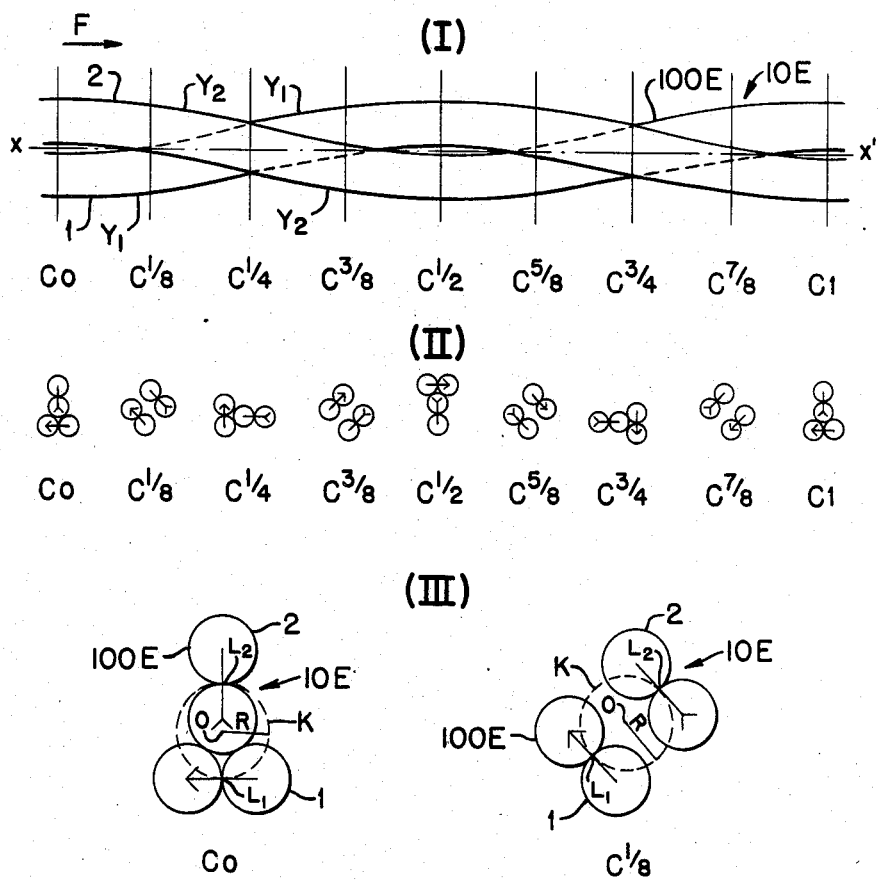
Figure 10:
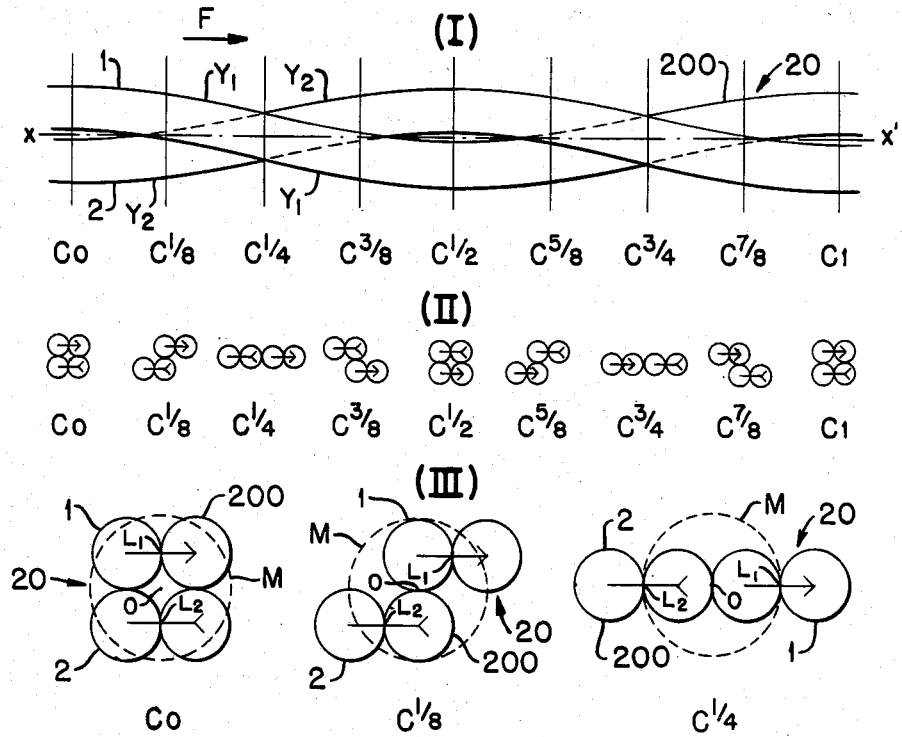
Figure 11:
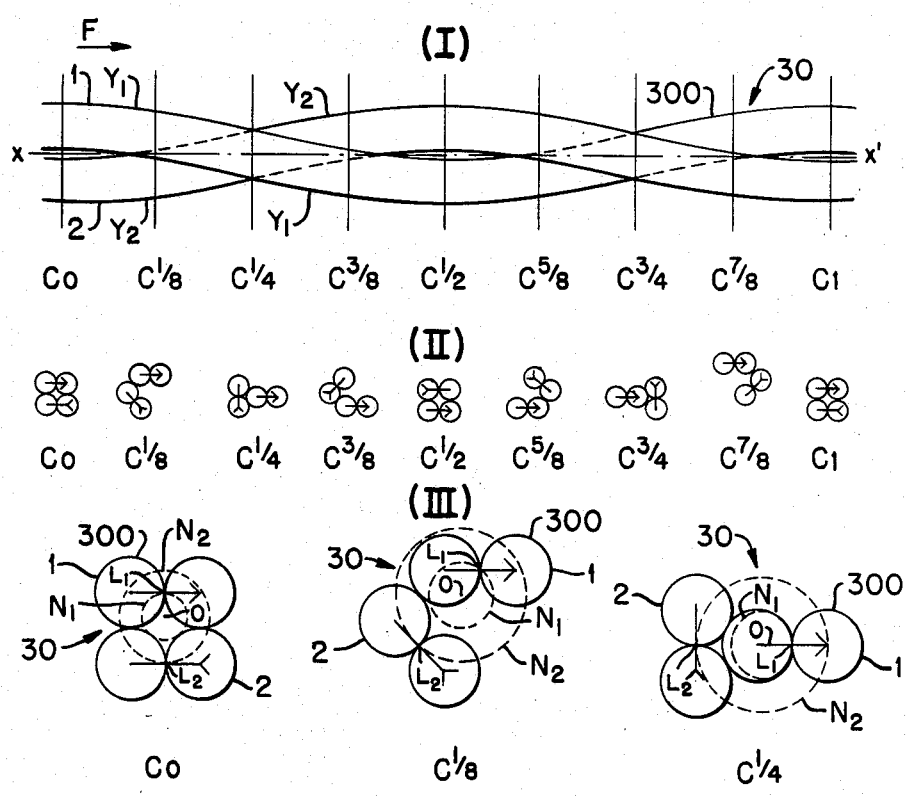

each of FIGS. 5 to 13 shows a cable, the cables shown in FIGS. 5 to 9, 12 and 13 being in accordance with the invention, whereas the cables shown in FIGS. 10 and 11 are known prior art cables; each of these FIGS. 5 to 13 is formed of three parts: a part (I) which shows the cable seen in side view, a part (II) showing a series of transverse cross sections through this cable, and a part (III) showing some of the transverse cross sections of part (II) in greater detail.

Figure 1:
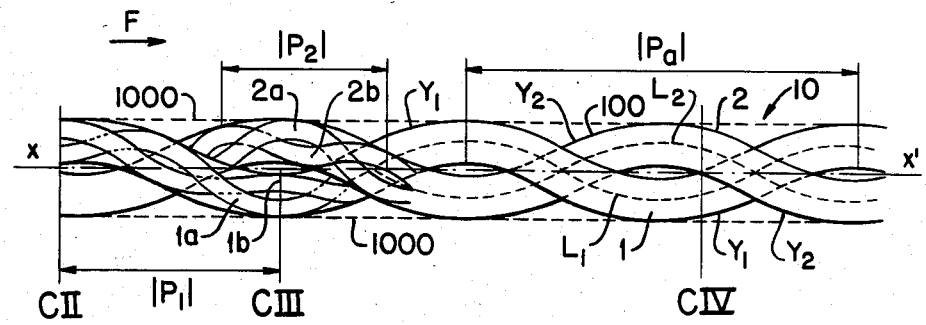
FIG. 1 shows a cable according to the invention, seen in side view.

FIG. 1 shows a cable 10 in accordance with the invention. This cable 10 is formed solely of an assembly 100, only two strands of which have been shown in FIG. 1 for the sake of clarity of the drawing. These strands are marked 1 and 2. This showing is not limitative.

The strand 1 is formed of the two continuous wires 1a, 1b, and the strand 2 is formed of the two continuous wires 2a, 2b. For the clarity of the drawing, each strand 1 or 2 is indicated schematically by two lines, $Y_1$ in the case of strand 1 or $Y_2$ in the case of strand 2, each of these two lines $Y_1$ or $Y_2$ corresponding to the imaginary cylinder tangent to this strand, and the wires 1a, 1b, 2a, 2b have been shown only in a part (left hand portion) of the drawing in FIG. 1. In FIG. 1, each of these lines $Y_1$ or $Y_2$ is continuous when the corresponding strand 1 or 2 is visible in profile, this line being otherwise dash. The axis xx' of the assembly 100 is the axis of the imaginary cylinder 1000 tangent to the assembly 100, this cylinder 1000 being schematically indicated by dash lines in FIG. 1. The axis xx' is assumed rectilinear for the descriptions which follow. In each strand 1, 2, the two wires 1a, 1b for strand 1, or wires 2a, 2b for strand 2 are wound around each other in the same so called "direction of the strand."

For clarity of the drawing, in FIG. 1 spaces have been shown between the strands, on the one hand, and between the wires of the strand, on the other hand.

Figure 2:
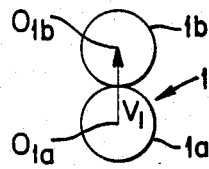
FIGS. 2 and 3 show transverse cross sections through a strand of the cable shown in FIG. 1.
Figure 3:
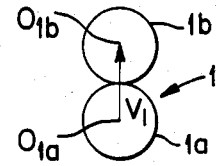

FIG. 2 shows a transverse cross section through the strand 1 represented by the straight line segment CII in FIG. 1, while FIG. 3 shows a transverse cross section through the strand 1 represented by the straight line segment CIII in FIG. 1. These sections are taken along planes perpendicular to the axis xx' of the assembly 100, these sections being viewed in the same direction, for instance in the direction xx', as shown in FIG. 1, that is to say in the direction indicated by the arrow F. In the following description, all the sections along planes perpendicular to the axis xx' will be viewed in the direction indicated by the arrow F.

In FIGS. 2 and 3, $O_{1a}$ represents the center of the cross section of the wire 1a, and $O_{1b}$ represents the center of the cross section of the wire 1b. In each of FIGS. 2 and 3, the vector $V_1$ connects the centers $O_{1a}$, $O_{1b}$ together and is directed from $O_{1a}$ towards $O_{1b}$. The cross sections of FIGS. 2, 3 are such that the vectors $V_1$ of these cross sections are substantially parallel and in the same direction. The distance $|p_1|$ separating cross section CIII from cross section CII is the shortest along the axis xx' in order to establish the parallelism and orientation of the vector $V_1$ of the section CII (FIG. 1). The distance $|p_1|$ which is constant for this assembly 100, measured in millimeters, represents by definition the length of the "pitch $p_1$ of the strand 1." The same definition applies to the strand 2, the length $|p_2|$ of the pitch $p_2$ of this strand 2 being shown in FIG. 1. The lengths of pitches $|p_1|$, $|p_2|$ are less than 300 mm.

In each strand 1, 2, the two wires 1a, 1b or 2a, 2b have substantially linear contact with each other, this line of contact being represented by the dotted line $L_1$ in the case of the strand 1 and by the dotted line $L_2$ in the case of the strand 2. Each of these lines $L_1$, $L_2$ describes substantially a helix, called the "contact helix", around the axis xx'. These contact helices $L_1$, $L_2$ have the same direction, called the "direction of the assembly," and the same constant length of pitch $|p_a|$, called the "length of the pitch $p_a$ of the assembly"; this length of pitch $|p_a|$ is also measured in millimeters.

Figure 4:
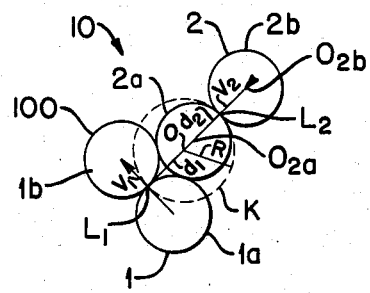
FIG. 4 shows a transverse cross section through the cable shown in FIG. 1.

FIG. 4 shows a transverse cross section through the cable 10 along a plane perpendicular to the axis xx', this plane being represented by the straight line segment CIV in FIG. 1. In this FIG. 4, the contact helix $L_1$ is represented by a dot as is the contact helix $L_2$.

For simplicity in the drawing, all the wires of the assembly 100 have the shape, in FIG. 4, of circles tangent at the point $L_1$ in the case of the strand 1, and at the point $L_2$ in the case of the strand 2. In this FIG. 4, the axis xx' is represented by the point O, the vector $V_1$ has the meaning previously defined, and the vector $V_2$ relative to the strand 2 connects the center $O_{2a}$ of the wire 2a to the center $O_{2b}$ of the wire 2b, this vector $V_2$ being oriented from $O_{2a}$ towards $O_{2b}$. For clarity in the drawing, in order easily to differentiate the vectors $V_1$ and $V_2$, the end of the vector $V_2$ located at $O_{2b}$ is shown as a reversed arrowhead.

By definition, the pitches $p_1$, $p_2$, $p_a$ are algebraic values whose lengths $|p_1|$, $|p_2|$, $|p_a|$ are absolute values, and each value $p_1$ or $p_2$ is positive if the direction of the winding of the corresponding strand 1 or 2 is the same as that of the assembly 100 and negative otherwise, the pitch $p_a$ of the assembly 100 being therefore always selected positive whatever the direction of this assembly, the pitches $p_1$, $p_2$, $p_a$ being constant for the assembly 100.

The assembly 100 satisfies at least one of the following two conditions:

(I) It is formed of two strands, the lengths of the pitches of the strands being equal and the directions of the strands being opposite. The pitches of the strands satisfy then the relationship $$p_1 = -p_2.$$

(II) It is formed of at least two strands and at most four strands; the length of the pitch of the assembly is equal to the length of the pitch of at least one of the strands, the direction of the assembly being the same as that of said strand or strands; at least one other strand of the assembly has either a length of pitch different from the length of the pitch of the assembly or both a length of pitch equal to the length of the pitch of the assembly and a direction opposite to the direction of the assembly.

When the assembly 100 is formed of two strands, this condition (II) can be expressed, for example, in the following manner:

$$p_a = p_1 \text{ and}$$

$p_2$ different from $p_a$, $p_2$ being capable of being positive or negative.

The cable 10 of the invention leads to the following geometry.

The distance from the contact helices to the axis of the assembly, in a plane perpendicular to said axis, is substantially the same for all of these helices. This distance is substantially constant or varies only slightly when one moves this plane along the axis. Thus, in FIG. 4, the distance $d_1$ between the points O and $L_1$ is substantially equal to the distance $d_2$ between the points O and $L_2$. This common distance remains substantially constant or varies only slightly when the plane of FIG. 4 moves along the axis xx' while remaining perpendicular to said axis, this variation being less than about 50%. In FIG. 4, the points $L_1$ and $L_2$ are therefore substantially always located on a circle, the radius of this circle being constant or varying only slightly when the plane of FIG. 4 moves along the axis xx'. Whatever this plane, the points $L_1$ and $L_2$ are therefore either situated substantially on a reference circle K with center O and constant radius R or near this circle K. This circle K is shown in dash line in FIG. 4.

This substantially constant geometry makes it possible to stress all the wires of the assembly 100 in substantially homogeneous manner upon the working of this assembly.

Each of FIGS. 5 to 13 shows a cable formed of two-wire strands, these cables being either cables according to the invention (FIGS. 5 to 9, 12 and 13) or known prior art cables (FIGS. 10 and 11).

Each of these FIGS. 5 to 13 is formed of three parts, namely:

a part (I) showing the cable seen in side view;

a part (II) showing a series of transverse cross sections through said cable taken in accordance with the above descriptions, that is to say perpendicular to the axis xx', these sections being viewed in the direction xx', that is to say in the direction indicated by the arrow F;

a part (III) showing some of the transverse cross sections of part (II) in greater detail.

Each of the sections shown in parts (II) and (III) is marked by the letter C followed by a whole or fractional number which represents the ratio between the distance separating this section from the section $C_0$ and the length of the pitch of the assembly, this number increasing in the direction of the arrow F, as shown in the parts (I) in which these sections are represented by straight-line segments.

Each of the cables shown in FIGS. 5 to 13 is formed of wires which have, for instance, the shape of cylinders of revolution of the same diameter when they are arranged linearly; these wires have, in the transverse cross sections of parts (II), (III), a shape which is circular, for simplicity of the drawing. For each cable shown in one of FIGS. 5 to 13, each transverse cross section in part (II) of this figure has a general shape which corresponds to one of the detailed transverse cross sections of part (III) of said figure, aside from the respective position of the wires in each strand.

Each of the cables shown in FIGS. 5 to 11 is formed solely by an assembly of two strands of two wires. In these figures, the references 1, 2, $Y_1$, $Y_2$, $L_1$, $L_2$, O have the same meaning as in FIGS. 1 to 4, and the vectors $V_1$ and $V_2$, which have not been marked for purposes of simplification, have the same meaning and the same representation as in FIGS. 2 to 4.

For clarity in the drawing, in parts (I) of these FIGS. 5 to 11 spaces have been shown between the strands of each cable, these strands being schematically indicated by the lines $Y_1$ and $Y_2$ and the wires of these strands not being shown.

The cables of the invention which are shown in FIGS. 5 to 9 are embodiments of the cable 10 which has been previously described.

Figure 5:
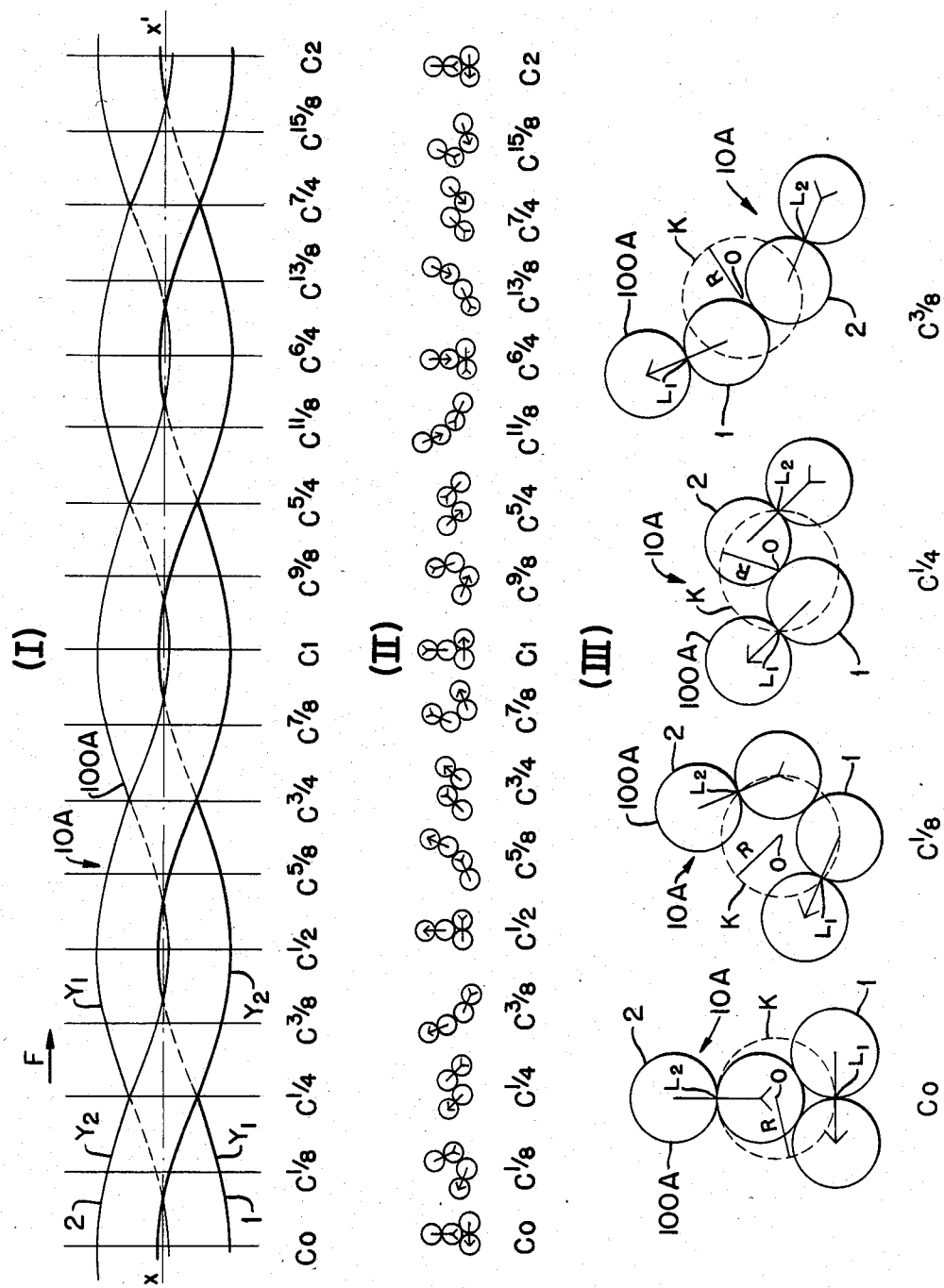

The assembly 100A of the cable 10A of the invention which is shown in FIG. 5 satisfies the following conditions:

$$p_1 = -p_2; p_1 = 2 p_a.$$

Figure 6:
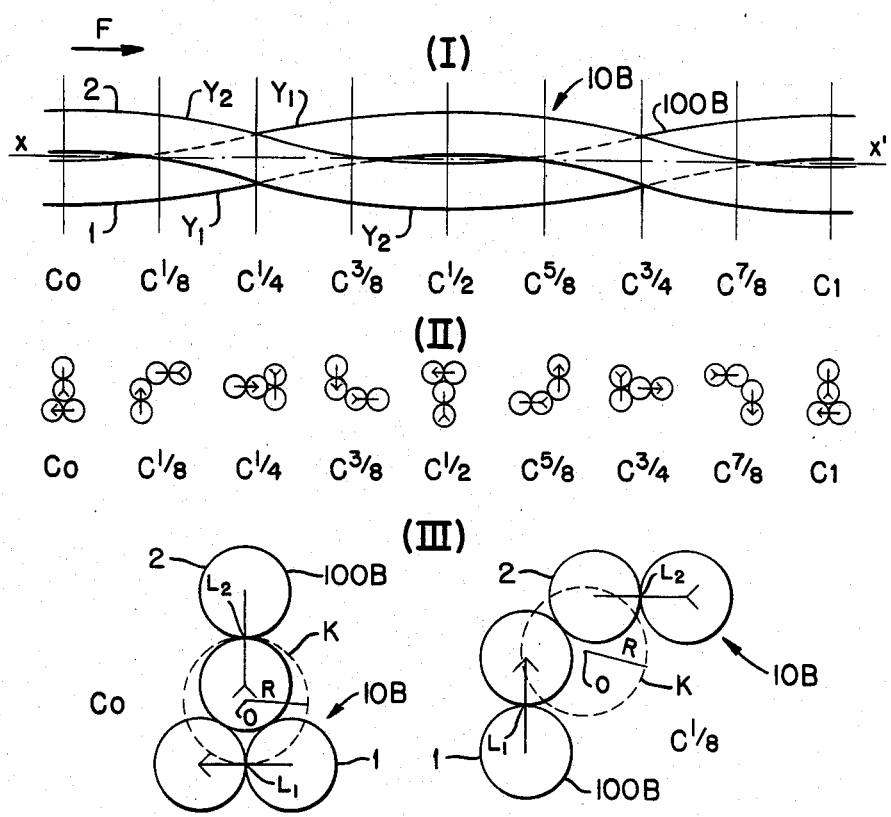

The assembly 100B of the cable 10B of the invention which is shown in FIG. 6 satisfies the following conditions:

$$p_1 = -p_2; p_1 = \tfrac{1}{2} p_a.$$

Figure 7:
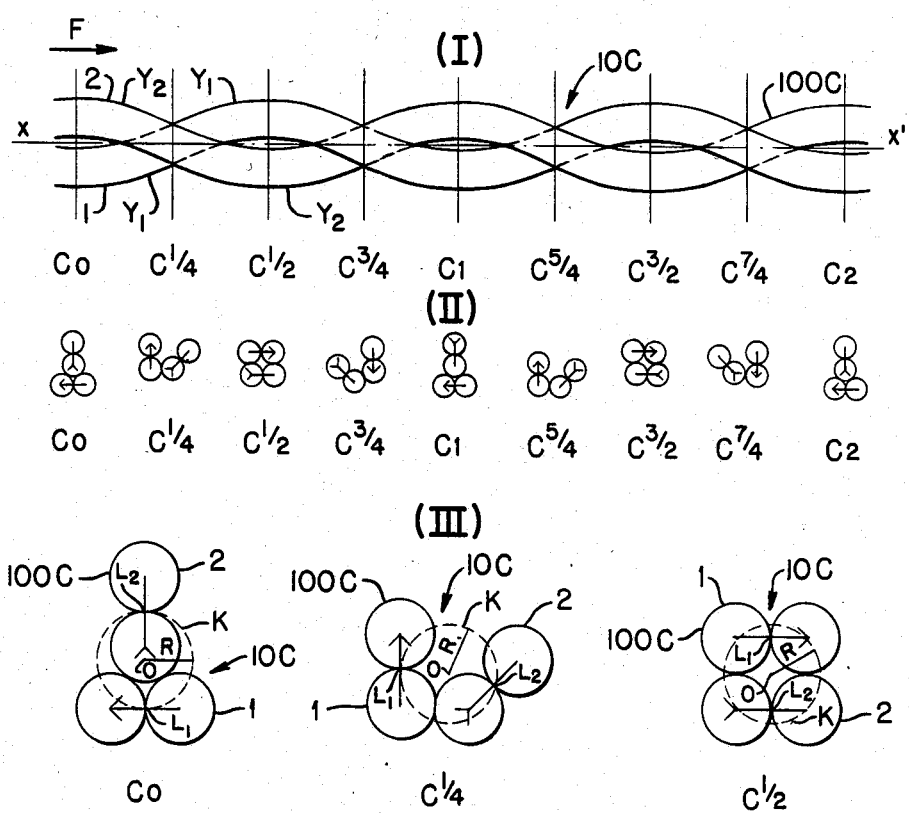

The assembly 100C of the cable 10C of the invention which is shown in FIG. 7 satisfies the following conditions:

$$p_2 = 2 p_1; p_1 = p_a.$$

The assembly 100D of the cable 10D of the invention which is shown in FIG. 8 satisfies the following conditions:

$$p_2 = \tfrac{1}{2} p_1; p_1 = p_a.$$

The assembly 100E of the cable 10E of the invention which is shown in FIG. 9 satisfies the following conditions:

$$p_a = p_1 = -p_2.$$

The algebraic numbers $p_1$, $p_2$, $p_a$ have the meanings which have been previously defined, that is to say, for example, in the case of the cable 10A the length of the pitch of the strand 1 is equal to the length of the pitch of the strand 2, the directions of the strands 1 and 2 are opposite, the direction of the strand 1 is the same as the direction of the assembly, and the length of the pitch of the assembly is equal to one-half of the length of the pitch of each strand 1 or 2.

The known prior art cables which are shown in FIGS. 10 and 11 are such that in each strand the two wires have substantially linear contact in the form of helices marked $L_1$ or $L_2$. In each of these known cables, the helices $L_1$, $L_2$ are wound in the same direction, also called the "direction of the assembly" around the axis xx' of the assembly constituting this cable, with a constant common length of pitch $|p_a|$ also called the "length of the pitch of the assembly." These known cables, furthermore, have the following characteristics:

the assembly 200 of the known cable 20 which is shown in FIG. 10 is such that the wires of each strand 1 or 2 remain parallel to each other without winding around each other, that is to say the lengths of the pitches $p_1$ and $p_2$ are infinite and therefore greater than 300 mm.

The assembly 300 of the known cable 30 which is shown in FIG. 11 is such that the wires of the strand 1 remain parallel to each other without winding around each other, that is to say the length of the pitch $p_1$ is infinite and therefore greater than 300 mm. The assembly 300 furthermore satisfies the following condition: $p_2 = p_a$.

A study of FIGS. 5 to 9 provides the following information concerning the assemblies 100A to 100E of the cables 10A to 10E of the invention.

For each of these assemblies, no continuous channel is formed between the wires of the strands, which assures good penetration of the impregnating material into this assembly.

The size of these assemblies is small, in particular in the case of the assemblies 100B, 100C, 100D, 100E, in which the maximum size is on the order of three times the diameter of the wires of the strands 1, 2. Furthermore, this size varies only slightly.

In each of the transverse cross sectional views shown in parts (II) and (III) of FIGS. 5 to 9, the lines $L_1$, $L_2$ are located practically at the same distance from the axis xx' for a given assembly, this being more particularly evident in parts (III) where the lines $L_1$, $L_2$ are represented by dots in the same way that the axis xx' is represented by the point O (for purposes of simplification, the distances between $L_1$ and O, on the one hand, and between $L_2$ and O, on the other hand, have not been referenced). This distance is substantially constant or varies only slightly from one section to another. Thus the cross sections (part III) of each of FIGS. 5 to 9 show in dotted line the reference circle K with center O and radius R such that all points $L_1$, $L_2$ are either on this circle or near this circle, R being constant for this assembly.

This arrangement of the assemblies 100A to 100E permits a homogeneous working of these assemblies as a result of a homogeneous distribution of the stresses, on the one hand, between the strands of these assemblies and, on the other hand, between the wires forming these strands.

Preferably, when the relationship $p_1 = -p_2$ applies, the length of the pitch $p_a$ being different from the length of the pitches $p_1$ and $p_2$, the length of the pitch $p_a$ is selected greater than the length of the pitches $p_1$, $p_2$, as in the case of the assembly 100B, in order to limit the size of the assembly.

Of all the cables 10A to 10E, cable 10E (FIG. 9) is the preferred cable for the following reasons:

The assembly 100E has a maximum size which is at most equal to that of the other assemblies.

In each transverse cross sectional view of FIG. 9 (part III), the circle K of constant radius R passes nearly precisely through the points $L_1$, $L_2$, that is to say the helices $L_1$, $L_2$ are substantially perfect circular helices of the same radius R.

The space between two transverse cross sections of identical general shape is the shortest, this space being equal to $|p_a|/4$. This small space further favors the homogeneous working of the assembly.

A study of FIGS. 10 and 11 provides the following information concerning the known prior art cables.

The assembly 200 of the known cable 20 which is shown in FIG. 10 has a size which varies greatly and the maximum of which is very large, this maximum size being equal approximately to four wire diameters. Furthermore, the distance from each helix $L_1$, $L_2$ to the axis of the assembly 200 varies greatly from one cross section to the other, that is to say these helices cannot be considered circular helices. Thus, FIG. 10 (part III) shows in dotted line the circle M of center O passing through the points $L_1$, $L_2$ at the cross section C $\frac{1}{4}$, that is to say when the size of the assembly 200 passes through its maximum. It can be seen from this FIG. 10 (part III) that in the cross sections $C_O$ and C $\frac{1}{8}$ the points $L_1$, $L_2$ are located definitely within this circle M, the variation in distance with respect to the point O being on the order of 100%.

The assembly 300 of the known cable 30 which is shown in FIG. 11 shows asymmetry of the strands 1, 2 with respect to each other, since in the case of each cross section the distance from the helix $L_1$ to the axis xx' is less than the distance from the helix $L_2$ to this axis. Thus FIG. 11 (part III) shows for each cross section in dotted line the circle $N_1$ of center O passing through the point $L_1$ and the circle $N_2$ of center O passing through the point $L_2$. It can be seen that in each of the cross sections of this FIG. 11 (part III) the circles $N_1$, $N_2$ are always separated, $N_1$ remaining within $N_2$, that is to say the helices $L_1$, $L_2$ are not located on the same cylinder, the helix $L_2$ wrapping around the helix $L_1$. The geometrical variations of the helices $L_1$, $L_2$ in these known assemblies 200, 300 have the result that the distribution of the stresses between the strands, on the one hand, and between the wires forming these strands, on the other hand, is heterogeneous, which results in a heterogeneous working in these assemblies.

Figure 12:
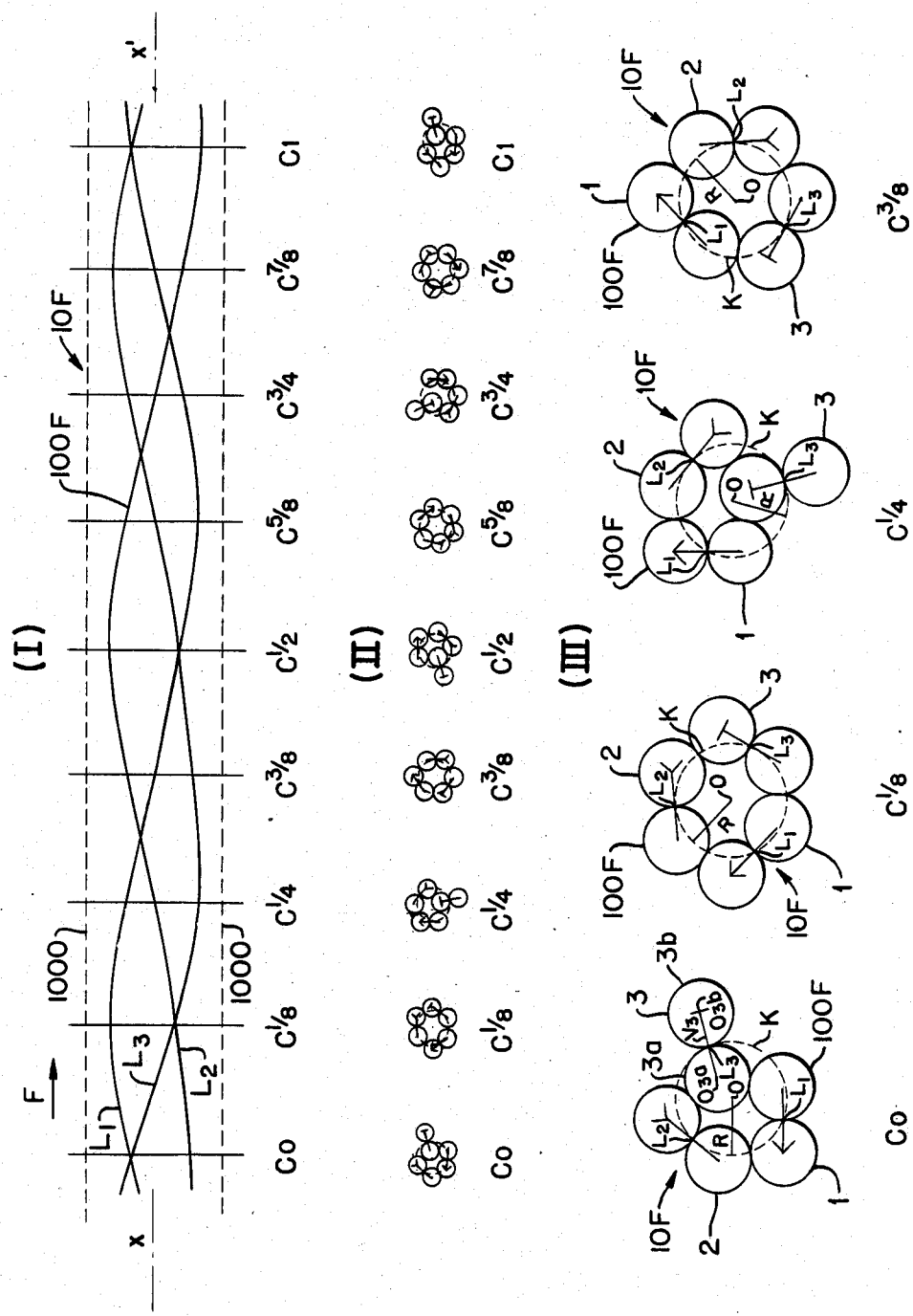

The cable 10F of the invention which is shown in FIG. 12 is another embodiment of the cable 10 which has been previously described. This cable 10F is formed solely by an assembly 100F of three strands of two wires, these strands being marked 1, 2, 3. For simplicity in the drawing, the cable 10F is shown in FIG. 12 (part I) by the previously defined cylinder 1000 and by the contact helices $L_1$, $L_2$, $L_3$ shown in the form of continuous lines, these helices having the same direction and the same length of pitch $|p_a|$. In the drawing, the references $L_1$, $L_2$ have the same meaning as before, $L_3$ is the contact helix of the wires $3a$, $3b$ with each other, these wires $3a$, $3b$ forming the strand 3 whose pitch is $p_3$. The meaning and representation of the vectors $V_1$, $V_2$ are the same as previously, these vectors not being provided with references for purposes of simplification. As can be noted from transverse cross section $C_O$ of FIG. 12 (part III), the vector $V_3$ relative to the strand 3 connects the center $O_{3a}$ of the wire $3a$ to the center $O_{3b}$ of the wire $3b$ and, for the sake of clarity of the drawing and in order to easily distinguish the vectors $V_1$, $V_2$, $V_3$, the end of the vector $V_3$ located at $O_{3b}$ has the shape of a T in all of the cross sections of FIG. 12 (part II) and FIG. 12 (part III). As previously, the axis xx' of assembly 100F is represented by the point O on the cross sections of FIG. 12 (part III). The assembly 100F is such that one has the relations:

$$p_a = p_1 = p_2; \; p_3 = -p_a.$$

FIGS. 12 (part II) and 12 (part III) show that the lines $L_1$, $L_2$, $L_3$ are located substantially at the same distance from the axis xx'. Thus the transverse cross sections of FIG. 12 (part III) represent in dotted line the circle K of the center O and constant radius R in the case of this assembly 100F, this circle being such that all points $L_1$, $L_2$, $L_3$ lie substantially on this circle, that is to say the helices $L_1$, $L_2$, $L_3$ are substantially cylindrical helices of the same radius R. The arrangement of the cable 10F according to the invention assures a homogeneous working of the assembly 100F as a result of the homogeneous distribution of the stresses, on the one hand, between the strands of this assembly and, on the other hand, between the wires forming these strands.

Figure 13:
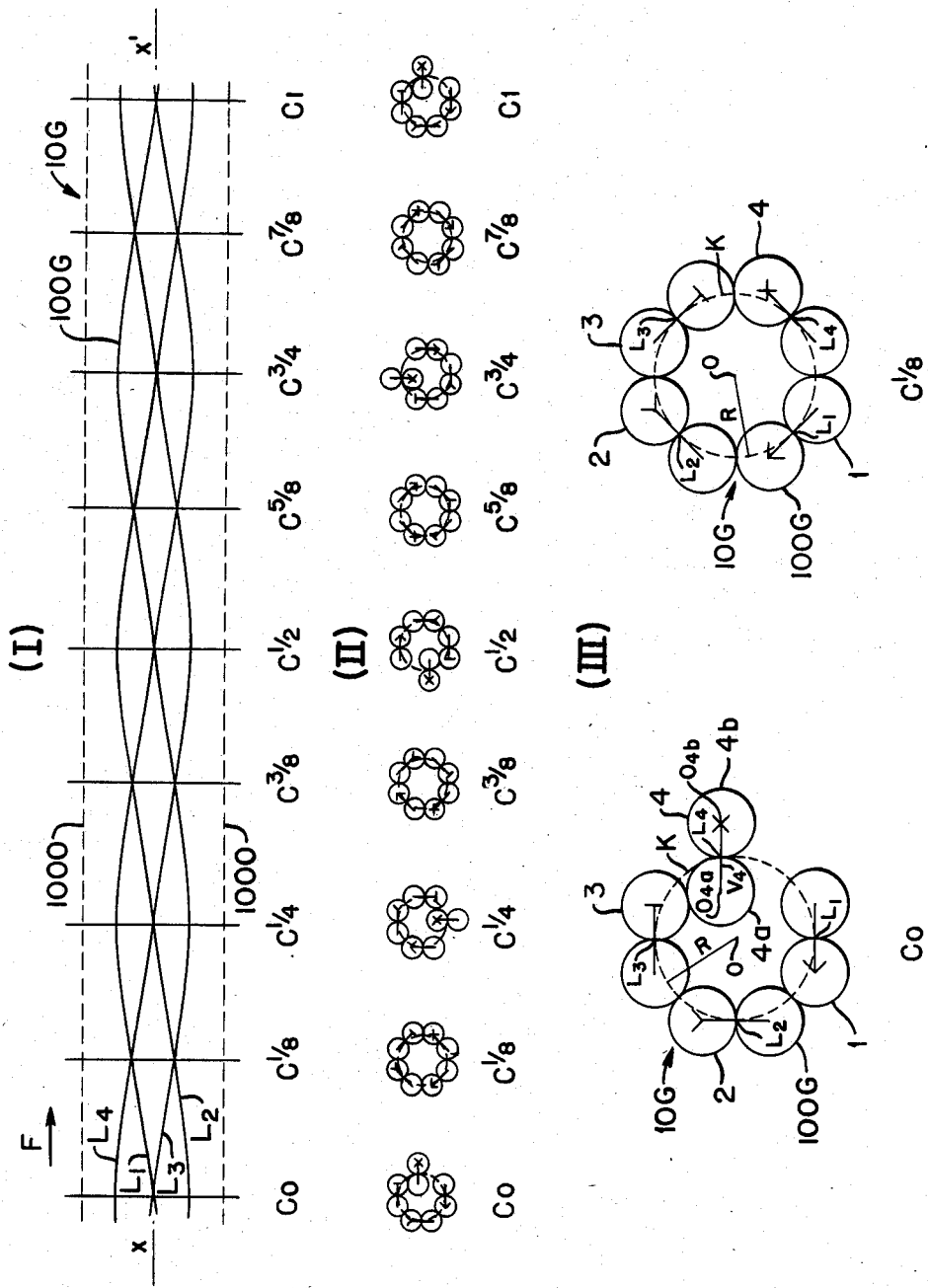

The cable 10G of the invention which is shown in FIG. 13 is another embodiment of the cable 10 which has been described above. This cable 10G is formed solely by one assembly 100G of four strands of two wires, these strands being marked 1, 2, 3, 4. In the drawing, the references $L_1$, $L_2$, $L_3$, O, 1000 have the same meaning as previously. The meaning and representation of the vectors $V_1$, $V_2$, $V_3$ are the same as previously, these vectors not being marked for purposes of simplification. $L_4$ is the contact helix between the wires $4a$, $4b$ of the strand 4, this helix having the same pitch $p_a$ as the helices $L_1$, $L_2$, $L_3$. As can be seen from the transverse cross section $C_O$ of FIG. 13 (part III), the vector $V_4$ relative to the strand 4 connects the center $O_{4a}$ of the wire $4a$ to the center $O_{4b}$ of the wire $4b$ and for the sake of clarity of the drawing the end of the vector $V_4$ located at $O_{4b}$ has the shape of an X in all the cross sections of FIGS. 13 (part II) and 13 (part III). The strand 4 has the pitch $p_4$. The assembly 100G satisfies the following conditions:

$$p_a = p_1 = p_2 = p_3 = -p_4.$$

In FIG. 13 (part III) it can be seen that the points $L_1$, $L_2$, $L_3$, $L_4$ are substantially on the circle K of center O and of constant radius R in the case of the assembly 100G, with the previously described consequences which result from this substantially constant geometry.

The cables of the invention which have been described above are formed of assemblies without a core, which makes it possible to improve the homogeneity of the working of all the strands of these assemblies.

The cables of the invention can be used to reinforce a material, for instance a rubber, in particular in order to manufacture pneumatic tires. In this case, it is preferable to impregnate the cables with a material compatible with the rubber which they are to reinforce, this material being itself in particular a rubber and the impregnation being effected, for instance, by calendering before the incorporating of the cables into the material to be reinforced. The wires of the cables of the invention can each be made with at least one material whose nature may vary, such as an inorganic material, in particular glass, an organic material, in particular a cellulose material, or an organic polymer, for example a polyester or a polyamide, which polymer can possibly be aromatic, or a metallic material, in particular steel.

By way of example, when the tires reinforced by these cables are tires intended for passenger cars, the lengths of the pitches of the strands may be far less than 300 mm or even 100 mm. Such a cable can, for instance, be a steel cable of the formula (2×2) 0.28 mm, this cable being formed entirely of an assembly of two strands themselves each formed by two steel wires of a diameter of 0.28 mm, this cable satisfying the relationships $p_1 = -p_2$, $p_1 = p_a$ with $|p_1| = |p_2| = |p_a| = 12$ mm.

When the cable of the invention is formed of an assembly such that all the strands have the same length of pitch as the length of the pitch of the assembly, one or more of these strands, but not all of the strands, having a direction opposite that of the assembly, and if one compares this unhooped cable to a known hooped cable having the same number of wires as this assembly, but wound together in the same direction and with the same pitch, the length of which is equal to the length of the pitch of this assembly according to the invention, the wires having initially the same characteristics in both cases, it can be noted that when these two cables are arranged in a vulcanized rubber, the tensile strength of the cable of the invention is less than that of the known cable, but that the rigidity upon compression and the resistance to compression of the cable of the invention are greater than those of the known cable, so that this cable of the invention is particularly well adapted to use in the crown of pneumatic tires. This is true, in particular, of the cables 10E, 10F, 10G of the invention previously described.

By way of example, there is employed in the crown of one and the same pneumatic tire:

either an unhooped steel cable according to the invention of the formula (2×2) 0.23 mm, this cable being formed solely of an assembly of two strands themselves each formed by two steel wires of a diameter of 0.23 mm, this cable satisfying the relationships $p_1 = -p_2$, $p_1 = p_a$ with $|p_1| = |p_2| = |p_a| = 10$ mm;

or a known hooped cable formed of four steel wires of the same original characteristics as those of the wires of the cable (2×2) 0.23 mm, these wires being twisted together in the same direction with the same length of pitch as this cable (2×2) 0.23 mm, that is to say 10 mm.

It is then noted that in this vulcanized crown the tensile strength of the cable of the invention is about 6% less than that of the known cable, but that the rigidity upon compression and the resistance to compression of the cable of the invention are about 14% greater than those of the known cable, which makes it possible to improve the performance of the tire as a result of this cable of the invention.

The cables of the invention which have been described above were each formed of a single assembly of strands of two wires, but the invention applies also to cables each of which contains several assemblies of strands of two wires, these assemblies being, for instance, stranded with each other. It is to be noted, furthermore, that the invention applies to cables which are not formed solely by one or more assemblies of strands of two wires; thus it covers, for instance, cables having a core formed by an assembly of two-wire strands, this core being surrounded by one or more layers of wires or of strands of any nature whatsoever, these layers being in particular unsaturated in order to permit migration of material.

The cables of the invention can be made with known equipment and by known processes, such equipment and processes not being described for reasons of simplification.

The invention is, of course, not limited to the embodiments which have been described above.

What is claimed is:

1. A reinforcement cable characterized by the fact that it is formed solely or at least in part by an assembly of strands, said assembly having the following characteristics when its axis is rectilinear:
   (a) each strand consists of two wires;
   (b) in each strand the two wires are wound around each other in the same direction, called the "direction of the strand," with a constant pitch, called the "pitch of the strand," the length of this pitch being less than 300 mm;
   (c) in each strand the two wires have substantially linear contact with each other, this line of contact describing substantially a helix, called the "contact helix," around the axis of the assembly;
   (d) all the contact helices have the same direction, called the "direction of the assembly," and the same constant length of pitch, called the "length of the pitch of the assembly";
   (e) the distance from the contact helices to the axis of the assembly, in a plane perpendicular to said axis, being substantially the same for all of these helices;
   (f) the strands are twisted together;
   (g) the assembly satisfies at least one of the following two conditions:
   (I) it consists of two strands, the lengths of the pitches of the strands being equal and the directions of the strands being opposite;
   (II) it is formed of at least two strands and at most four strands; the length of the pitch of the assembly is equal to the length of the pitch of at least one of the strands, the direction of the assembly being the same as that of said strand or strands; at least one other strand of the assembly has either a length of pitch different from the length of the pitch of the assembly or both a length of pitch equal to the length of the pitch of the assembly and a direction opposite to the direction of the assembly.

2. A reinforcement cable according to claim 1, characterized by the fact that the assembly is formed of two strands, the lengths of the pitches of the strands being equal and the directions of the strands being opposite, and by the fact that the length of the pitch of the assembly is greater than the length of the pitch of the strands.

3. A reinforcement cable according to claim 1, characterized by the fact that the assembly is formed of two strands, the length of the pitch of the assembly being equal to the length of the pitch of one of the strands, the direction of the assembly being the same as that of said strand, the other strand having a length of pitch different from the length of pitch of the assembly, the direction of this strand being the same as that of the assembly.

4. A reinforcement cable according to claim 1, characterized by the fact that the assembly is formed of two strands, the length of pitch of the assembly being equal to the length of pitch of one of the strands, the direction of the assembly being the same as that of said strand, the other strand having a length of pitch equal to the length of pitch of the assembly and a direction opposite to the direction of the assembly.

5. A reinforcement cable according to claim 1, characterized by the fact that the assembly is formed of three strands, the length of pitch of the assembly being equal to the length of pitch of two of the strands, the direction of the assembly being the same as that of these two strands, the other strand having a length of pitch equal to the length of pitch of the assembly and a direction opposite to the direction of the assembly.

6. A reinforcement cable according to claim 1, characterized by the fact that the assembly is formed of four strands, the length of pitch of the assembly being equal to the length of pitch of three of the strands, the direction of the assembly being the same as that of these three strands, the other strand having a length of pitch equal to the length of pitch of the assembly and a direction opposite to the direction of the assembly.

7. A reinforcement cable according to one of claims 1-6, characterized by the fact that the lengths of the pitches of the strands of the assembly are less than 100 mm.

8. A reinforcement cable according to one of the claims 1-6, characterized by the fact that the contact helices of the strands are substantially circular helices of the same radius.

9. A reinforcement cable according to claim 1, characterized by the fact that it is formed by an assembly of strands such that all the strands have the same length of pitch as the length of pitch of the assembly, one or more of these strands, but not all of these strands, having a direction opposite to the direction of the assembly; and by the fact that it is usable in the crown of a pneumatic tire.

10. A reinforcement cable according to one of claims 1-6 or 9, characterized by the fact that it is impregnated with a material.

11. A reinforcement cable according to claim 10, characterized by the fact that said material is a rubber.

12. An article comprising at least one reinforcement cable according to claim 1.

13. An article according to claim 12, characterized by the fact that it is a pneumatic tire.

* * * * *